United States Patent [19]
Mathis

[11] 3,821,141
[45] June 28, 1974

[54] FLAME RETARDANT POLYOLEFIN COMPOSITION OF IMPROVED COLOR AND MELT STABILITY

[75] Inventor: Ronald D. Mathis, Taylors, S.C.

[73] Assignee: Phillips Petroleum Company, Bartlesville, Okla.

[22] Filed: Apr. 17, 1972

[21] Appl. No.: 244,894

[52] U.S. Cl..... 260/23 H, 260/45.7 P, 260/45.75 B, 260/45.85 R, 260/45.95 G, 260/45.95 J, 260/45.95 R
[51] Int. Cl............................ C08f 45/58, C08f 45/62
[58] Field of Search.... 260/23 H, 45.75 B, 45.85 R, 260/45.95 J, 45.7 P, 45.95 G, 45.95 R

[56] References Cited
UNITED STATES PATENTS

| | | | |
|---|---|---|---|
| 2,903,487 | 9/1959 | Coffield | 260/45.75 B |
| 3,075,944 | 1/1963 | Wiek et al. | 260/45.75 B |
| 3,244,650 | 4/1966 | Hecker et al. | 260/23 H |

*Primary Examiner*—Donald E. Czaja
*Assistant Examiner*—Eugene C. Rzucidlo

[57] ABSTRACT

Flame retardant polyolefin compositions having improved color and melt stability are obtained by the addition of a phenolic stabilizer and a metal soap mixture to said compositions.

14 Claims, No Drawings

FLAME RETARDANT POLYOLEFIN COMPOSITION OF IMPROVED COLOR AND MELT STABILITY

This invention relates to flame retardant polyolefin compositions and to methods for the preparation of same.

Flame retardant polyolefin compositions are highly desirable raw materials for manufacture of various compression and injected molded items such as plastic pipe, rods, sheets, and the like. In the formulation of flame retardant polyolefin compositions it has been generally found that these polyolefin compositions exhibit undesirable color and melt degradation at temperatures commonly employed in molding and extruding said compositions into finished articles of manufacture. Accordingly because of the economic advantage and in most cases the economical necessity of employing thermally stable polymer compositions of widely varying colors in the production of plastic articles, means for improving the melt and color stability of flame retardant polyolefin compositions is desirable. However many commercial stabilizers lose a significant part of their effectiveness when combined with flame retardants.

It is an object of this invention to provide flame retardant polyolefin compositions that exhibit improved melt flow processing characteristics. Still another object is to provide flame retardant polyolefin compositions of improved color stability. Still further it is an object to provide both melt and color stable flame retardant polyolefin compositions. Other objects of this invention will be apparent from the written description and the appended claims.

According to this invention, flame retardant polyolefin compositions are stabilized against undesirable color and melt degradation by the addition of a phenolic stabilizer and a metal soap mixture to said compositions.

The polyolefins that can be employed in the practice of this invention are homopolymers and copolymers derived from the polymerization of 1-monoolefins having from two to eight carbon atoms. In most instances, the preferred polyolefins are homopolymers of ethylene or propylene, copolymers of ethylene with minor amounts of other monomers copolymerizable therewith such as propylene, butene-1, hexene-1, octene-1 and the like, or copolymers of propylene with minor amounts of other monomers copolymerizable therewith such as ethylene, butene-1, hexene-1, octene-1, and the like. Polyolefins wherein at least 50 mol percent of the polyolefin is derived from the polymerization of ethylene or propylene monomeric units are presently preferred. Even more preferred are polyolefins wherein at least 90 mol percent of the polyolefin is derived from the polymerization of ethylene or propylene monomeric units. Still even more preferred because of their commercial importance are propylene polymers wherein at least 90 mol percent of the polyolefin is derived from the polymerization of propylene and from about 0.5 to 10 mol percent of the polyolefin is derived from the polymerization of a comonomer selected from ethylene or butene-1.

The flame retardant additives that can be employed in the practice of this invention are halogenated organic compounds, preferably halogenated ethers. Preferred halogenated ethers include acyclic and cyclic hydrocarbyl ethers which contain from eight to 22 carbon atoms and can be represented by the following general formula:

$$X - O - Y$$

wherein X and Y individually represent acyclic and cyclic hydrocarbyl radicals at least one of which is partially halogenated. Preferably the hydrocarbyl radicals are selected from aliphatic, cycloaliphatic, and aromatic radicals or combinations thereof. Particularly preferred halogenated ethers are mixed alkyl aryl ethers wherein the aryl hydrocarbon group contains from six to 15 carbon atoms and the alkyl group contains from three to 12 carbon atoms. Representative halogenated mixed alkyl aryl ethers include 2,3-dibromopropyl 2,4,6-tribromophenyl ether, 11,12-dibromododecyl 2,6-dibromo-4-n-octylphenyl ether, 2,4,6-tribromophenyl benzyl ether, 3,4-dibromobutyl phenyl ether, 2,4,6-tribromophenyl cyclohexyl ether, 2,2-bis[4-(2,3-dibromopropoxy)phenyl]propane, 2,2-bis-[4-(2,3-dibromopropoxy)3,5-dibromophenyl]propane, and mixtures thereof.

Metal oxides can be employed in conjunction with halogenated organic compounds to improve the efficacy of the flame retardant additives. Representative metal oxides include arsenic trioxide, antimony trioxide and bismuth trioxide. Antimony oxide, preferably as the trioxide, is preferably employed with the halogenated ether.

The phenolic stabilizers that can be employed in the practice of this invention can be described by the formula:

(I)

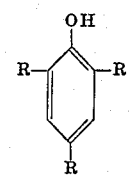

wherein each R represents an alkyl radical, and individually each R radical contains from one to eight carbon atoms. Representative of suitable commercially available phenolic stabilizers include 2,4,6-trimethylphenol, 2,6-diethyl-4-methylphenol, 2,4-dimethyl-6-t-butylphenol, 2,6-di-t-butyl-4-methylphenol, 2,6-di-t-amyl-4-hexylphenol, 2,6-di-t-octyl-4-n-octylphenol, 2,4,6-tri-t-butylphenol, and the like. Generally preferred phenolic stabilizers contain at least two tertiary alkyl radicals. Presently preferred phenolic stabilizers are 2,6-di-t-alkyl-4-methylphenols. Especially preferred is the 2,6-di-t-butyl-4-methylphenol.

The metal soap mixtures employed in the practice of this invention comprise a mixture of a polyvalent metal soap, a polyvalent metal phenolate, and a triaryl phosphite. The polyvalent metal soaps can be represented by the formula $(R'COO)_2M$, wherein each $R'$ is a cyclic or acyclic hydrocarbyl radical, individually each $R'$ radical contains from seven to 22 carbon atoms, and M is selected from the polyvalent metals barium, cadmium, calcium, lead, strontium, tin and zinc. Presently preferred are polyvalent metal soaps wherein M is barium cadmium or zinc, and mixtures thereof. The polyvalent metal phenolates can be represented by the formula $M(OR'')_2$, wherein each $R''$ is an aryl or alkaryl hydrocarbyl radical, individually each $R''$ radical contains from four to 18 carbon atoms, and M is the same as represented hereinbefore. The triaryl phosphites can be selected from triaryl phosphites containing eight to 22 carbon atoms.

The improved flame retardant polyolefin compositions of this invention comprise any composition containing a polyolefin, a halogenated organic compound, a phenolic stabilizer, and a metal soap mixture. Generally preferred compositions contain on a weight basis per 100 parts of polyolefin at least 0.005 part, more preferably from 0.005 to 2.5 parts, of a phenolic stabilizer; at least 0.1 part, more preferably from 0.1 to 2.5 parts, of metal soap mixture; at least 1 part, more preferably from 1 to 20 parts, of halogenated organic compound; at least 0.5 part, more preferably from 0.5 to 10 parts of metal oxide. More preferred compositions contain from 0.1 to 1.5 parts of phenolic stabilizer; from 0.2 to 1.5 parts of metal soap mixture; from 1.5 to 5 parts of halogenated organic compound; and from 0.75 to 2.5 parts of metal oxide.

In the preparation of the flame retardant polyolefin compositions of this invention, the phenolic stabilizers and metal soap mixtures can be combined with a halogenated organic compound and a polyolefin by means of any suitable process, providing the process intimately admixes all of the ingredients of the compositions. Suitable processes include dry blending of the ingredients of the compositions in subdivided form and subsequently masticating the resulting admixture at polyolefin melt temperatures for a period of time sufficient to form a homogeneous polyolefin composite.

Set out hereinafter are examples which illustrate my invention, Included are examples of the best motor practicing invention, which accordingly are not to be considered as unduly limitative.

EXAMPLE I

Various flame retardant polyolefin compositions were prepared containing a phenolic stabilizer, or a phenolic stabilizer and a metal soap mixture. The compositions were separately dry blended by tumbling in a closed container for 30 minutes, and subsequently masticated in a Brablender plastograph at 200°C for 5 minutes under a nitrogen atmosphere. The chemical constituents of the various compositions are set out in Table I. The polymer compositions of Table I, set out hereafter, were subsequently evaluated by melt flow extrudate tests wherein the weight of polyolefin composition extruded, under a 268.5 gram load, during a one-minute time interval was measured after a 5 minute and a 10 minute pre-extrusion time residence period at 490°F in accordance with ASTM D 1238-62T condition L test procedure. The extrudate temperature was also 490°F. The melt flow extrudate test data is set out in Table II. In addition, the polyolefin extrudate compositions were compression molded into small discs, one inch in diameter by 1/16-inch thick and color rated against a standard color scale wherein a numerical value of 1 indicates a clean bright yellow color, increasing numerical values indicate increasing green discoloration, and a numerical value of 5 indicates green-black discoloration. The color rating data is set out in Table II.

TABLE I

| Run Number | 1 | 2 | 3 | 4 | 5 | 6 | 7 |
|---|---|---|---|---|---|---|---|
| Chemical Ingredients, by weight | | | | | | | |
| Polyolefin[a] | 100 | 100 | 100 | 100 | 100 | 100 | 100 |
| Halogenated Organic Compound[b] | 2 | 2 | 2 | 2 | 2 | 2 | 2 |
| Metal Oxide[c] | 1 | 1 | 1 | 1 | 1 | 1 | 1 |
| Phenolic Stabilizer-1[d] | 0.1 | — | 0.1 | 0.5 | — | — | — |
| Phenolic Stabilizer-2[e] | — | 0.5 | — | — | 0.5 | — | 0.5 |
| Phenolic Stabilizer-3[f] | — | — | — | — | — | 0.5 | 0.5 |
| Metal Soap Mixture[g] | — | — | 0.5 | 0.5 | 0.5 | 0.5 | 0.5 |
| Pigment[h] | 1 | 1 | 1 | 1 | 1 | 1 | 1 |

TABLE II

| Extrudate Test Conditions Pre-extrusion Temp. °F/Min. | Melt Flow Extrudate Values | | | | | | |
|---|---|---|---|---|---|---|---|
| 490°/5 min. | 0.065 | 0.047 | 0.094 | 0.074 | 0.044 | 0.063 | 0.045 |
| 490°/10 min. | .083 | .078 | .339 | .159 | .053 | .132 | .058 |
| | Color Ratings | | | | | | |
| 490°/5 min. | 1.75 | 1.75 | 1.25 | 1.25 | 1.25 | 1.50 | 1.25 |
| 490°/10 min. | 2.25 | 2.00 | 1.75 | 1.75 | 1.25 | 1.75 | 1.25 |

(a) Polypropylene containing trace quantities, i.e., less than 0.02 part of 2,6-di-t-butyl-4-methylphenol per 100 parts of polypropylene.
(b) 2,3-Dibromopropyl 2,4,6-tribromophenyl ether
(c) Antimony trioxide
(d) Octadecyl[3-(3,5-di-t-butyl-4-hydroxyphenyl)]propionate
(e) 2,6-di-t-butyl-4-methylphenol
(f) Nickel bis(O-ethoxy-3,5-di-t-butyl-4-hydroxybenzylphosphonate)
(g) Liquid mixture of barium, cadmium, and zinc carboxylates and alkylphenolates, and a triaryl phosphite, the elemental analysis being about 6.2 wt. percent barium, about 2.1 wt. percent cadmium, about 1.3 wt. percent zinc and about 1.5 wt. percent phosphorus
(h) Yellow 3G (dispersion form, i.e., 25% pigment - 75% polypropylene, by weight)

The above melt flow data illustrates that the melt stability of flame retardant polyolefins is improved by the presence of a metallic soap mixture and a phenolic stabilizer, and is particularly improved by the combined presence of a metallic soap mixture and a phenolic stabilizer of Formula I specifically described elsewhere in this specification.

The above color rating data illustrate that both the melt flow stability and the color stability of the flame retardant polyolefin compositions are improved concurrently by the present of a metal soap mixture and a phenolic stabilizer of Formula I.

Further modifications of the teachings of this invention by the use of phenolic stabilizers and metal soap mixtures to impart improved melt and color stability to flame retardant polyolefin compositions will be apparnet to those skilled in the art.

That which is claimed is:

1. A flame retardant composition consisting essentially of a polyolefin selected from homopolymers and copolymers derived from the polymerization of 1-monoolefins having from two to eight carbon atoms, a halogenated ether selected from the group consisting of acyclic and cyclic hydrocarbyl ethers which contain from eight to 22 carbon atoms, a phenolic stabilizer having the formula:

(I)
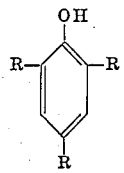

wherein each R represents an alkyl radical, and a metal soap mixture containing a polyvalent metal soap having the formula

wherein each R' is a cyclic or acyclic hydrocarbyl radical, M is selected from polyvalent metals barium, cadmium, calcium, lead, strontium, tin and zinc, a polyvalent metal phenolate having the formula

wherein M is the same as represented hereinbefore, and R'' is an aryl or alkylaryl hydrocarbyl radical, and a triaryl phosphite.

2. A composition in accord with claim 1 wherein the ether is represented by the formula:

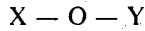

wherein X and Y, individually, are selected from the group consisting of acyclic and cyclic hydrocarbyl radicals and partially halogenated acyclic and cyclic hydrocarbyl radicals, and wherein at least one of X and Y is a partially halogenated acyclic or cyclic hydrocarbyl radical.

3. A composition in accord with claim 2 wherein the composition contains on a weight basis, per 100 parts of said polyolefin, from about 1 to about 20 parts of said halogenated ether, from about 0.005 to about 2.5 parts of said phenolic stabilizer, and from about 0.1 to about 2.5 parts of said metal soap mixture.

4. A composition in accord with claim 3, wherein the composition contains a metal oxide selected from oxides of arsenic, antimony, and bismuth.

5. A composition in accord with claim 4 wherein the composition contains on a weight basis, per 100 parts of said polyolefin, from about 0.5 to about 10 parts of said metal oxide.

6. A composition in accord with claim 5, wherein said polyolefin is polypropylene.

7. A composition in accord with claim 6, wherein said phenolic stabilizer is 2,6-di-t-butyl-4-methylphenol, said metal soap mixture contains the metals barium, cadmium, and zinc, said halogenated ether is 2,3-dibromopropyl 2,4,6-tribromophenyl ether, and said metal oxide is antimony trioxide.

8. A method of preparing a flame retardant polyolefin composition having improved melt and color stability which consists essentially of (1) a polyolefin selected from homopolymers and copolymers derived from the polymerization of 1-monoolefins having from two to eight carbon atoms; (2) a halogenated ether selected from the group consisting of acyclic and cyclic hydrocarbyl ethers which contain from eight to 22 carbon atoms; (3) a phenolic stabilizer having the formula:

(I)
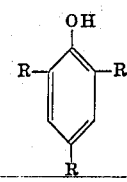

wherein each R represents an alkyl radical; (4) a metal soap mixture containing a polyvalent metal soap having the formula

wherein each R' is a cyclic or acyclic hydrocarbyl radical, M is selected from polyvalent metals barium, cadmium, calcium, lead, strontium, tin and zinc; (5) a polyvalent metal phenolate having the formula

wherein M is the same as represented hereinbefore, and R'' is an aryl or alkylaryl hydrocarbyl radical; and (6) a triaryl phosphite; which comprises admixing said polyolefin, said halogenated ether, said phenolic stabilizer, said metal soap mixture, said polyvalent metal phenolate, and said triaryl phosphite; and thereafter forming the resulting admixture into a molded or extruded flame retardant polyolefin composition by masticating the resulting admixture at polyolefin melt temperatures for a period of time sufficient to form a homogeneous polyolefin composite.

9. A method in accord with claim 8 wherein the ether is represented by the formula:

wherein X and Y, individually, are selected from the group consisting of acyclic and cyclic hydrocarbyl radicals and partially halogenated acyclic and cyclic hydrocarbyl radicals, and wherein at least one of X and Y is a partially halogenated acyclic or cyclic hydrocarbyl radical.

10. A method in accord with claim 9 wherein the composition contains on a weight basis, per 100 parts of said polyolefin, from about 1 to about 20 parts of said halogenated ether, from about 0.005 to about 2.5 parts of said phenolic stabilizer, and from about 0.1 to about 2.5 parts of said metal soap mixture.

11. A method in accord with claim 10 wherein the composition contains a metal oxide selected from the oxides of arsenic, antimony, and bismuth.

12. A method in accord with claim 11 wherein the composition contains on a weight basis, per 100 parts of said polyolefin, from about 0.5 to about 10 parts of said metal oxide.

13. A method in accord with claim 12 wherein said polyolefin is polypropylene.

14. A method in accord with claim 13 wherein said phenolic stabilizer is 2,6-di-t-butyl-4-methylphenol, said metal soap mixture contains the metals barium, cadmium, and zinc, said halogenated ether is 2,3-dibromopropyl 2,4,6-tribromophenyl ether, and said metal oxide is antimony trioxide.

* * * * *